US005295145A

United States Patent [19]

van der Laak

[11] Patent Number: 5,295,145

[45] Date of Patent: Mar. 15, 1994

[54] POWER SUPPLY WITH MULTI-PARAMETER CONTROL

[75] Inventor: Henricus J. M. van der Laak, Eindhoven, Netherlands

[73] Assignee: U.S. Philips Corporation, New York, N.Y.

[21] Appl. No.: 856,782

[22] Filed: Mar. 24, 1992

[30] Foreign Application Priority Data

Mar. 25, 1991 [EP] European Pat. Off. ........ 91200658.2

[51] Int. Cl.[5] ........ H01S 3/00

[52] U.S. Cl. ........ 372/38

[58] Field of Search ........ 372/38, 81; 323/280, 323/281

[56] References Cited

U.S. PATENT DOCUMENTS 4,998,257 3/1991 On et al. ........ 372/38

OTHER PUBLICATIONS

Philips Technical Review, vol. 39, Jan. 1980, No. 2, "A Semiconductor Laser for Information Read-Out", by Finck, van der Laak and Schrama, pp. 37–47.

*Primary Examiner*—Rodney B. Bovernick
*Assistant Examiner*—Robert E. Wise
*Attorney, Agent, or Firm*—Bernard Franzblau

[57] ABSTRACT

A power supply apparatus for supplying a device (1) with electric energy comprises at least two test inputs (5*a*, . . . , 5*d*) for receiving test signals which are dependent on a variable which itself is dependent on the power applied to the device. Each test input is connected to a first input of an associated comparator circuit (9*a*, . . . , 9*d*), the second input (11*a*, . . . , 11*d*) of which is connected to a generator for generating a number of reference signals which corresponds to the number of test inputs. The reference signals represent the desired values of said variables. The outputs of the comparator circuits are connected to a control member which is adapted to control the power applied to the device by the power supply apparatus so that at least one of the variables is essentially equal to the desired value, the other variables deviating from their desired values in a predetermined sense only.

17 Claims, 3 Drawing Sheets

POWER SUPPLY WITH MULTI-PARAMETER CONTROL

BACKGROUND OF THE INVENTION

This invention relates to a power supply apparatus for supplying a device with electric energy and, comprising at least one test input for receiving a test signal which is dependent on a variable which itself is dependent on the power applied to the device. The test input is connected to a first input of a comparator circuit, a second input of which is connected to a generator which is adapted to generate a reference signal which is a measure of a desired value of said variable. An output of the comparator circuit is connected to a control member which is adapted to control the power applied to the device by the power supply apparatus so that said variable is essentially equal to the desired value.

An example of such a power supply apparatus is described in Philips Technical Review 39 (1980), No. 2, pp. 37–47, notably with reference to FIG. 14. The known power supply apparatus is intended to power a semiconductor laser and includes, a photodiode which is accommodated in the same envelope as the laser for generating a photocurrent which is proportional to the light flux of the laser and which constitutes the test signal. The power applied to the laser in the known power supply apparatus can be controlled so that the current produced by the photodiode (monitor) remains constant at a desired value. The control of only one variable, however, involves the risk that the value of another laser variable is no longer within the desired range or, even worse, no longer within the safe range. Driving a semiconductor laser diode beyond the safe working range can readily damage the laser. For safe operation of a laser, therefore, it would be desirable to control the power applied to the laser so that more than one of the laser variables is maintained at or near a desired value. In addition to said monitor current, such variables are, for example, the laser current and the laser voltage and the radiant power of the laser. However, in practice this is a difficult problem because the various variables are interrelated in a rather complex manner.

SUMMARY OF THE INVENTION

It is an object of the invention to provide a power supply apparatus of the kind set forth which enables one variable to be maintained at a desired value while maintaining the other variables at least within limits which are considered to be safe.

To achieve this, the power supply apparatus in accordance with the invention is characterized in that the power supply apparatus comprises at least two test inputs with associated comparator circuits, the generator being adapted to generate a number of reference signals which correspond to the number of test inputs, the control member being adapted to control the power applied to the device by the power supply apparatus so that at least one of the variables corresponding to the test signals is essentially equal to the value desired for the relevant variable, the other variables corresponding to the test signals deviating from the associated desired values in a predetermined sense only.

Using the power supply apparatus in accordance with the invention, a variable which can in principle be chosen at random can be maintained at the desired value, the other variables, for example, all remaining below the desired value so as to preclude the possibility of exceeding said value and of a higher, dangerous value. If a deviation of a variable to a value below a given value is deemed risky, the control member should, of course, be adapted so that the relevant variable always remains above an adjusted value which is higher than the "risky" value.

The control member may comprise, for example, a suitably programmed microprocessor which decides which variable is to be maintained at the desired value in order to keep the other variables below (or above) their respective desired values. This microprocessor can also control the adjustment of the chosen variable and the monitoring of the other variables.

An embodiment in which the control member can be constructed without including a microprocessor is characterized in that the control member comprises a number of semiconductor diodes which corresponds to the number of test inputs, each semiconductor diode comprising a first and a second connection, the first connections being connected to one another and to a current source circuit, each second connection being connected to the output of one of the comparator circuits. A control member thus constructed satisfies the requirements imposed without requiring further control. When it is specified that the variables which are not maintained at the desired value should each remain below its desired value, the first connection of each of the semiconductor diodes must be an anode connection.

An embodiment of the power supply apparatus in accordance with the invention which is suitable for a variety of applications is characterized in that the variables represented by the test signals include an electric voltage applied to the device and an electric current taken up by the device.

An embodiment which is particularly suitable for supplying a semiconductor laser with electric energy is characterized in that the variables represented by the test signals also include the radiant power of the laser and a signal produced by a monitor connected to the laser.

BRIEF DESCRIPTION OF THE DRAWINGS

The invention will be described in detail hereinafter with reference to the accompanying drawing in which.

DESCRIPTION OF THE PREFERRED EMBODIMENTS

Figure 1:
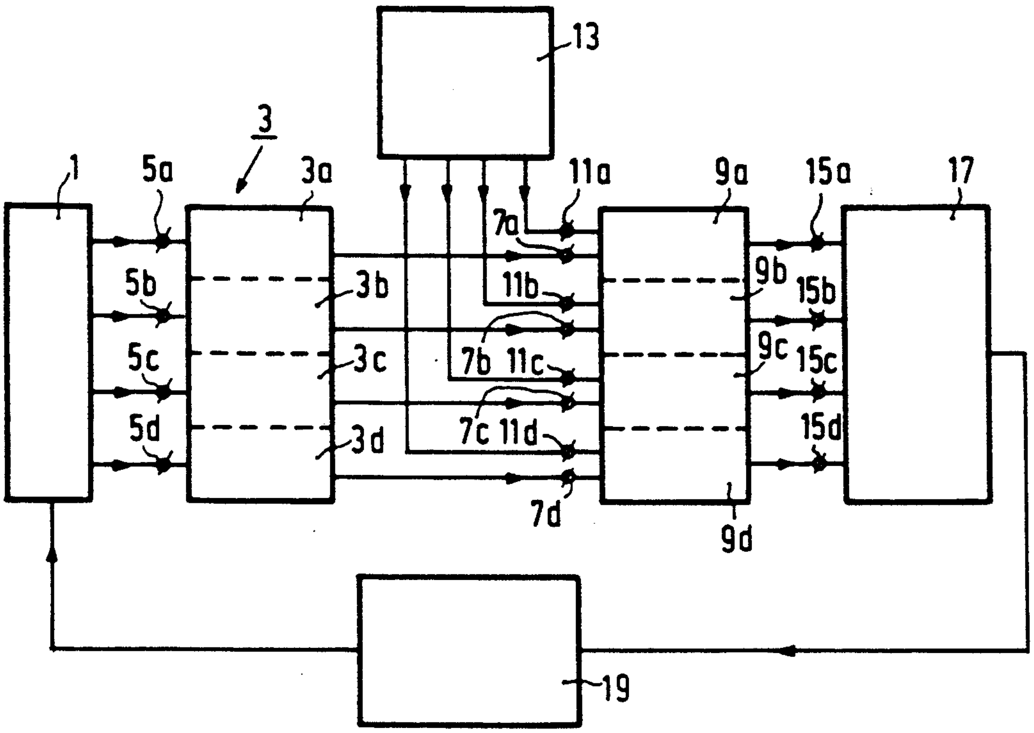
FIG. 1 shows a block diagram of an embodiment of a power supply apparatus in accordance with the invention.

The power supply apparatus shown in the form of a block diagram in FIG. 1 serves to supply a device 1 with electric energy. The device 1 may be, for example, a semiconductor laser. The power supply apparatus comprises a test circuit 3 which, in the present embodiment, comprises four test inputs 5*a*, 5*b*, 5*c*, 5*d*, which can receive test signals from the device 1. The value of each test signal is dependent on a variable which itself is dependent on the power applied to the device 1. The test circuit 3 consists of four sections 3*a* to 3*d*, each of which is connected to one of the four test inputs 5*a* to 5*d*. The output of each section 3*a* . . . 3*d* is connected to a first input 7*a* . . . 7*d* of a comparator circuit 9*a* . . . 9*d*, a second input 11*a* . . . 11*d* of which is connected to a generator 13 which is adapted to generate a reference signal which is a measure of a desired value of the relevant variable. The output of each comparator circuit 9*a* . . . 9*d* is connected to an input 15*a* . . . 15*d* of a control member 17 which controls, via an output stage 19, the power applied to the device 1 so that at least one of the variables corresponding to the test signals is essentially equal to the value desired for the relevant variable, the other variables corresponding to their test signals not being greater than the relevant desired value.

Figure 2:
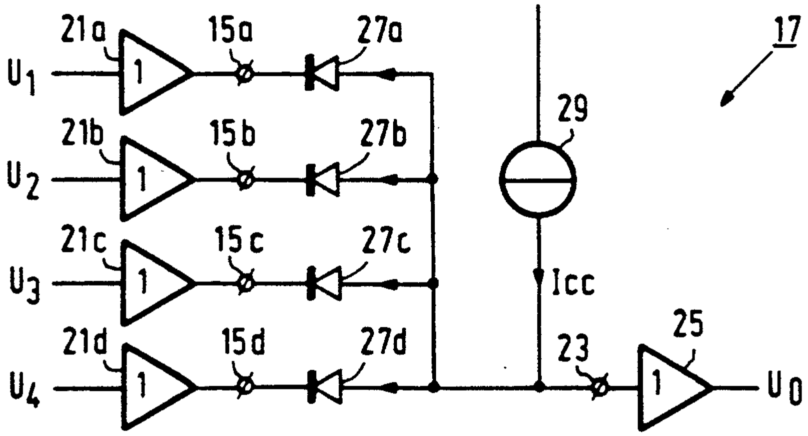
FIG. 2 shows a circuit diagram of a control member for the power supply apparatus shown in FIG. 1.

FIG. 2 shows an elementary circuit diagram of an embodiment of the control member 17. "Hard" voltages $U_1 \ldots U_4$ are applied to the inputs 15*a* . . . 15*d*, i.e. voltages originating from voltage sources without internal impedance. This is symbolically represented by unity amplifiers 21*a* . . . 21*d* preceding the inputs 15*a* . . . 15*d*. A unity amplifier 25 is also shown to be connected to the output 23 of the control member 17 so as to indicate that the circuit is not loaded by the impedance at the output.

The control member 17 comprises four semiconductor diodes 27*a* . . . 27*d*, each of which comprises a first and a second connection. In the embodiment shown, the first connection is the anode connection and the second connection is the cathode connection. The first connections are connected to one another and to a current source circuit 29. Each of the second connections is connected to respective ones of the inputs 15*a* . . . 15*d*.

In order to simplify the explanation of the operation of the circuit, in a first instance the restriction is imposed that there are only two input voltages $U_1$ and $U_2$. The current source 29 applies a constant current $I_{cc}$ to the diodes 27*a* and 27*b*. Depending on the voltages $U_1$ and $U_2$ presented, the current will be distributed between the two diodes so that a current $I_1$ flows through the diode 27*a* and a current $I_2$ flows through the diode 27*b*. The output voltage $U_o$ is thus defined. When the diodes 27*a* and 27*b* are assumed to be ideal and fully identical, the following relations hold:

$$I_1 = I_{sat}\left[\exp\left(\frac{q}{kT}(U_o - U_1)\right) - 1\right] \tag{1}$$

$$I_2 = I_{sat}\left[\exp\left(\frac{q}{kT}(U_o - U_2)\right) - 1\right] \tag{2}$$

$$I_{cc} = I_1 + I_2 \tag{3}$$

Therein, $I_{sat}$ represents the saturation current of the diodes, q is the charge of the electron, k is Boltzmann's constant, and T is the absolute temperature. The output voltage $U_o$ can be determined therefrom:

$$U_o = U_1 + U_2 - \frac{kT}{q}\ln\left[\exp\left(\frac{q}{kT}U_1\right) + \exp\left(\frac{q}{kT}U_2\right)\right] + \frac{kT}{q}\ln\left[\frac{I_{cc} + 2I_{sat}}{I_{sat}}\right] \tag{4}$$

Figure 3:
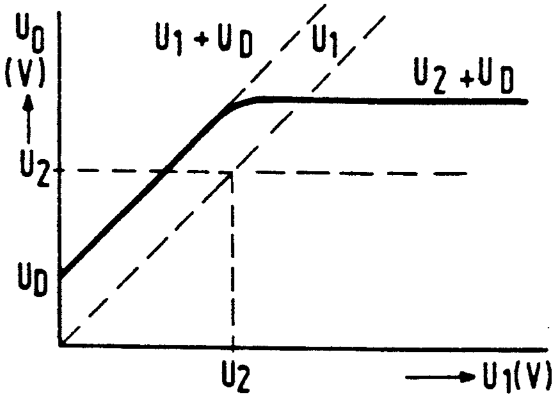
FIG. 3 shows a graph illustrating the operation of the control member shown in FIG. 2.

FIG. 3 graphically shows the transfer characteristic of the control member. For the sake of clarity, only one input voltage, that is the input voltage $U_1$ in the present case, is varied. The other input voltage $U_2$ is maintained constant at an arbitrary value. Depending on the relative position of the input voltages, three regions can be distinguished in the transfer function.

1. $U_1 < U_2$

In formule (4) the exponential term with $U_1$ can be ignored relative to that with $U_2$. The constant term with $I_{cc}$ very well approximates the voltage across the diode $U_D$ if the diode carries the full current $I_{cc}$. This is because for silicon diodes the extra term with $I_{sat}$ in the numerator can be completely ignored relative to the term with $I_{cc}$. As a result, the output voltage $U_o$ varies linearly as a function of the input voltage $U_1$ and is independent of the input voltage $U_2$:

$$U_o = U_1 + U_D \tag{5}$$

2. $U_1 \approx U_2$

This voltage region constitutes a transition region. In this case the formule (4) cannot be simplified and the value for the output voltage must be determined by calculation. All individual terms are continuous and can be differentiated, so that the transition is smooth:

$$U_o = U_1 + U_2 - \frac{kT}{q}\ln\left[\exp\left(\frac{q}{kT}U_1\right) + \exp\left(\frac{q}{kT}U_2\right)\right] + U_D \tag{6}$$

If the transition region is defined as the region in which the diode currents do not deviate by more than a factor one hundred, the total transition region for silicon diodes amounts to approximately $2(kT/q)\ln 0.01 \approx 230$ mV.

3. $U_1 > U_2$

Because the formule (4) is symmetrical in the input voltages, it follows from the interchanging of the indices that the output voltage $U_o$ varies linearly as a function of the input voltage $U_2$ and is independent of the input voltage $U_1$. Because $U_2$ is assumed to be constant, $U_o$ will be constant:

$$U_o = U_2 + U_D \tag{7}$$

If both input voltages vary, the output voltage $U_o$ will follow the lowest input voltage with a voltage offset equal to $U_D$. The described variation of the output voltage $U_o$ as a function of the input voltages is graphically shown in FIG. 3. It will be evident that the output voltage is substantially always equal to the smaller one of the two input voltages, except for the diode voltage $U_D$ which, however, is constant and known and for which, therefore, correction can be readily made. It is only in the transition region that the output voltage is not exactly equal to one of the two input voltages, but it is never greater than the smaller one of these input voltages. Thus, the device 1 is not endangered and a major advantage of the transition region consists in that no voltage peaks occur upon transition, as would be the case in response to an abrupt switching over.

The transfer function has been described above for two input variables. However, it can be readily demonstrated that the described calculation method can be applied to an arbitrary number of input variables. The general formula for the output voltage can thus be written as:

$$U_o = \sum_{i=1}^{N} U_i - \frac{kT}{q} \ln\left[\sum_{i=1}^{N} \exp\left(\frac{q}{kT} U_i\right)\right] + U_D \quad (8)$$

Except for the constant diode voltage $U_D$, therefore, outside the transition regions where the output voltage gradually changes from one to the other input voltage, the output voltage $U_o$ will be given by the minimum of the input voltages presented:

$$U_o = \min(U_1, U_2, \ldots, U_N) + U_D \quad (9)$$

The effect of the constant term $U_D$ can be eliminated by reducing, for example, the input voltages by an amount $U_D$ before presentation to the inputs of the control member. Another possibility consists in the reduction of the output voltage $U_o$ by this amount. However, because the control member 17 itself forms part of a closed feedback loop (see FIG. 1), the effect of $U_D$ will be reduced by division by the loop gain of the feedback loop.

Figure 4:
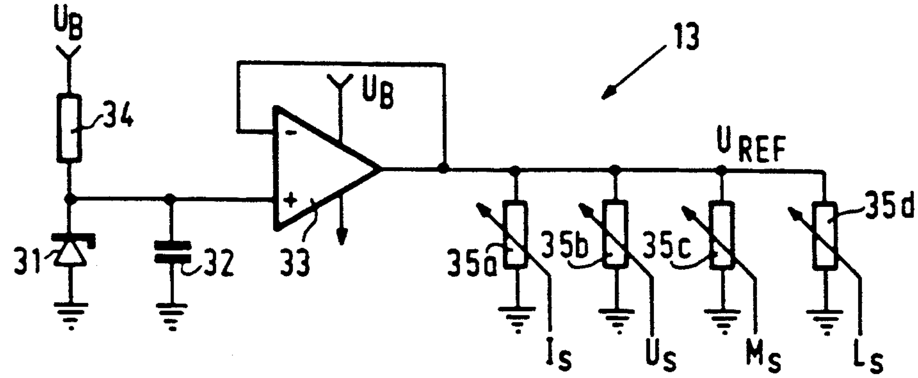
FIG. 4 shows a circuit diagram of a reference signal generator for use in the power supply apparatus shown in FIG. 1, FIGS. 5A and 5B show a circuit diagram of a test circuit for use in the power supply apparatus shown in FIG. 1.

FIG. 4 shows a circuit diagram of an embodiment of the reference signal generator 13. Using a zener diode 31 and an operational amplifier 33, a stabilized reference voltage $U_{REF}$ is formed from a supply voltage $U_B$. Four reference signals $I_s$, $U_s$, $M_s$ and $L_s$ can be formed from $U_{REF}$ by means of four accurate potentiometers 35*a*, 35*b*, 35*c* and 35*d*. If the device 1 is a semiconductor laser, $I_s$ and $U_s$ may represent desired values of the current I through and the voltage U across the laser, respectively. $M_s$ and $L_s$ then represent desired values of the output signals M and L of a photodiode which serves as a monitor and which is accommodated within the envelope of the laser, and a sensor measuring the light current of the laser, respectively. Parallel to the zener diode 31 there is connected a capacitor 32 and a resistor 34 is connected between the supply voltage $U_B$ and said parallel connection. The time constant of the combination formed by the capacitor 32 and the resistor 34 enables the reference voltage $U_{REF}$ and the reference signals derived therefrom to be controlled at a predetermined rate from the value zero to the working point. The parallel connection of the zener diode 31 and the capacitor 32 is connected to the positive input of the operational amplifier 33. When an external signal is superposed on this positive input, the reference signals can be modulated, if desired. The reference signals may in principle have any arbitrary shape; they may also be alternating voltages.

Figure 5A:
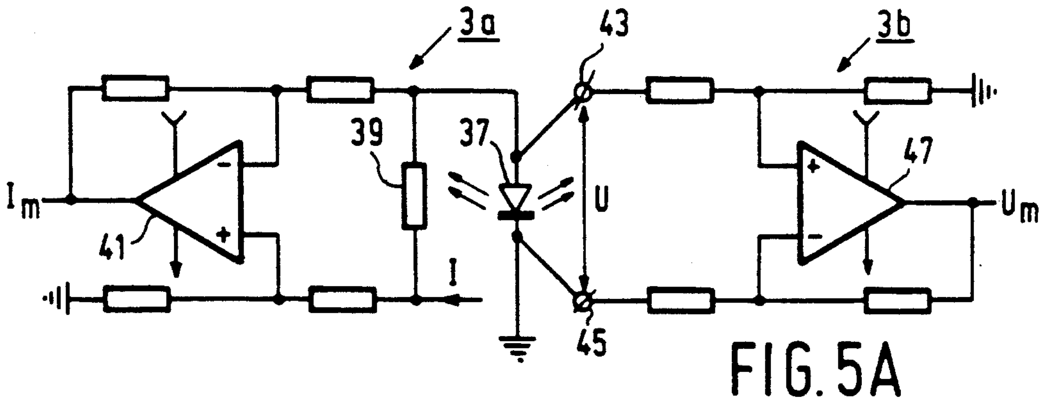
Figure 5B:
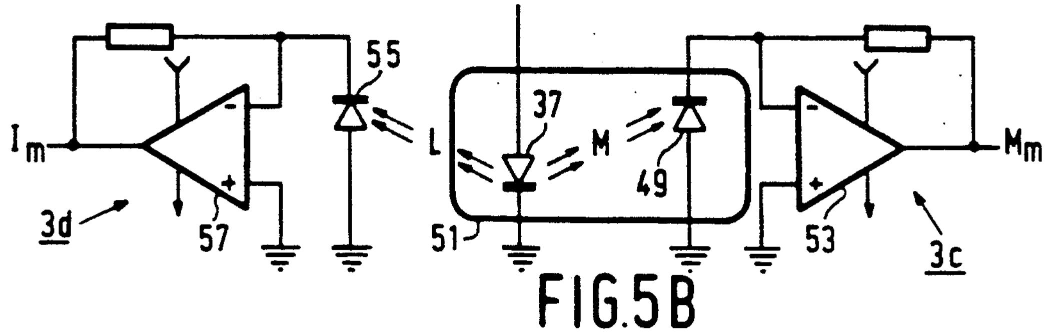

FIGS. 5A and 5B show a circuit diagram of an embodiment of a test circuit 3 for obtaining test signals $I_m$, $U_m$, $M_m$ and $L_m$ which represent the variables I, U, M and L. This test circuit comprises four sections 3*a* . . . 3*d*. For the sake of clarity, the sections 3*a* and 3*b* are shown, together with the semiconductor laser, in FIG. 5A, the sections 3*c* and 3*d* being shown in FIG. 5B, together with the semiconductor laser. The semiconductor laser is denoted by the reference numeral 37 in both Figures.

The first section 3*a* comprises a measuring resistor 39 which is connected in series with the laser 37. The voltage across this resistor, being proportional to the laser current I, is converted into the test signal $U_m$ by means of an operational amplifier 41.

The second section 3*b* comprises two connections 43 and 45 which are connected to the anode and to the cathode, respectively, of the laser 37. The laser voltage U can thus be measured in a currentless manner so that the voltage drop across the supply leads of the laser is eliminated (four-point measurement). Using an operational amplifier 47, the diode voltage U is converted into the test signal $U_m$.

As has already been described in the cited article in Philips Technical Review 39 (1980), No. 2, pp. 37–47, the semiconductor laser 37 is accommodated, together with a photodiode 49, serving as a monitor, in a common envelope 51 (see FIG. 5B). This photodiode forms part of the third section 3*c* and detects a light current M emerging at the rear of the laser 37. The current thus delivered by the photodiode 49 is converted into the test signal $M_m$ by means of an operational amplifier 53.

The fourth section 3*d* of the test circuit 3 comprises a photodiode 55 which is arranged outside the envelope 51 and which detects the light current L produced by the laser 37. The current generated by the photodiode 55 is converted into the test signal $L_m$ by means of an operational amplifier 57.

Figure 6:
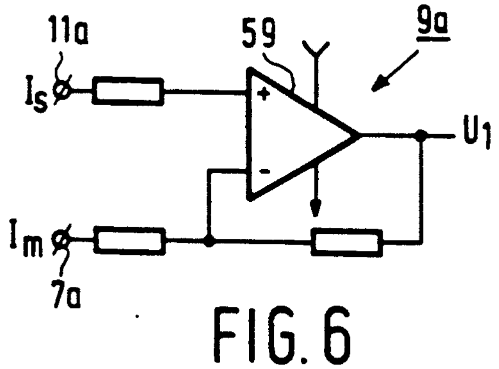
FIG. 6 shows a circuit diagram of a comparator circuit for use in the power supply apparatus shown in FIG. 1.

FIG. 6 shows a circuit diagram of an embodiment of one of the comparator circuits 9*a* . . . 9*d*. Only the first comparator circuit 9*a* is shown because the other comparator circuits 9*b* . . . 9*d* are identical thereto. The comparator circuit 9*a* shown comprises two inputs 11*a* and 7*a* which receive the current reference signal $I_s$ and the current test signal $I_m$, respectively. These inputs are connected to the positive and the negative input, respectively, of a differential amplifier 59 whose output produces an error signal $U_1$ which represents the difference $I_s - I_m$. The other comparator circuits 9*b* . . . 9*d* produce output signals $U_2 \ldots U_4$ which represent the differences $U_s - U_m$, $M_s - M_m$ and $L_s - L_m$, respectively. The output signals $U_1 \ldots U_4$ form the input signals for the control member 17 which supplies the control voltage $U_o$ for the semiconductor laser 37. The output signals $U_1 \ldots U_4$ of the differential amplifiers 59 are "hard" voltages so that the unit amplifiers 21*a* . . . 21*d* shown in FIG. 2 can actually be dispensed with.

Figure 7:
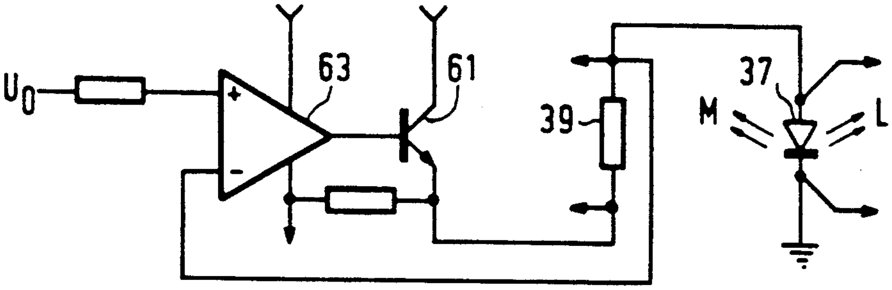
FIG. 7 shows a circuit diagram of an output stage for use in the power supply apparatus shown in FIG. 1.

The control voltage $U_o$ is applied to the input of the output stage 19, a circuit diagram of an embodiment of which is shown in FIG. 7. The output stage 19 is necessary to ensure that the control member 17 (FIG. 2) is not loaded by the current to be applied to the semiconductor laser 37. Therefore, the output stage 19 comprises an output transistor 61 which is capable of supplying adequate current so that the unity amplifier 25 shown in FIG. 2 actually can also be dispensed with. The output transistor 61 is controlled by an operational amplifier 63 to which the control voltage $U_o$ is applied and which does not load the output 23 of the control member 17. The output transistor 61 and the measuring resistor 39 (see also FIG. 5A), across which the laser current is measured, are included in the feedback loop of the operational amplifier 63 so that voltage drops across these components do not affect the laser control itself. The voltage across the laser 37 is measured by way of a four-point measurement as described, so that the voltage drop due to the resistance of the supply leads is again eliminated.

Figure 8:
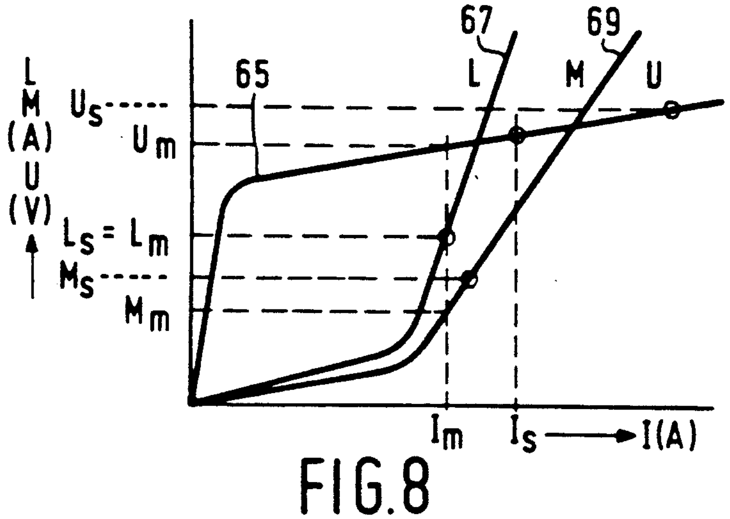
FIG. 8 shows a graph with characteristics of a semiconductor laser in order to illustrate the operation of the power supply apparatus in accordance with the invention.

FIG. 8 shows an example of the characteristics of a semiconductor laser diode. The curves 65, 67 and 69 represent the variation of the laser voltage U, the radiant power L and the monitor signal M, respectively, as a function of the laser current I. The reference values $I_s$, $U_s$, $L_s$ and $M_s$ are also shown. Using the described power supply apparatus, the laser current I is adjusted to a value $I_m$ for which none of said four variables is greater than the relevant reference value, one of said variables, in this case L, actually being equal to the reference value ($L_m=L_s$). If the reference value $L_s$ is increased by changing the setting of the potentiometer 35*d* (FIG. 4), the laser current I will increase until one of the other variables is substantially equal to the reference value, for example $M_m=M_s$. In the transition region, L as well as M is approximately equal to the associated reference value and in any case none of the four variables exceeds its reference value.

As has already been described, the power supply apparatus in accordance with the invention is particularly suitable for the supply of energy to a semiconductor laser, notably in measuring and life test set-ups. However, it will be evident that the apparatus can be used whenever two or more process variables are to be measured and controlled. It is to be noted that the invention is not restricted to the adjustment of a component, apparatus or process to a smallest value, given the values of a number of variables. The function of the control member 17 can be transformed to the highest setting, given the value of a number of variables, simply by reversing the polarity of the diodes 27*a* . . . 27*d* (FIG. 2) and the direction of the current $I_{cc}$. Thus, by a combination of the highest and the lowest setting within the control member 17 it is even possible to control a process in a given range, given the lowest and highest setting of a number of variables. A suitable field of application is the field of electric supply equipment in which generally the electric voltage and current are variables. By a combination of the positive lowest and negative highest setting within the control member, it is thus even possible to realise a so-called four-quadrant power supply. A four-quadrant power supply is a power supply capable of delivering as well as dissipating power. The nature of the device being powered is irrelevant in this respect. Notably capacitive, inductive and negative impedances can be driven without giving rise to stability problems because the invention utilizes real, non-complex measured values of current and voltage. The power supply apparatus can thus also be used as an adjustable load for other power supplies or other equipment.

I claim:

1. A power supply apparatus for supplying a multivariable device with electric energy, comprising: at least one test input for receiving a test signal which is dependent on a variable which itself is dependent on the power applied to the device, said test input being connected to a first input of a comparator circuit, means connecting a second input of the comparator circuit to a generator which is adapted to generate a reference signal which is a measure of a desired value of said variable, an output of the comparator circuit being connected to a control member which is adapted to control the power applied to the device by the power supply apparatus, at least two test inputs for test signals dependent on device variables and with associated comparator circuits for the test inputs, the generator being adapted to generate a number of reference signals which corresponds to the number of test inputs, the control member being adapted to control the power applied to the device by the power supply apparatus so that at least one of the variables corresponding to one of the test signals is essentially equal to the value desired for the relevant variable, the other variables, corresponding to other test signals, deviating from their associated desired values in a predetermined sense only.

2. A power supply apparatus as claimed in claim 1, wherein the control member comprises a number of semiconductor diodes which corresponds to the number of test inputs, each semiconductor diode comprising a first and a second connection, the first connection being connected to one another and to a current source circuit, each second connection being connected to a respective output of the comparator circuits.

3. A power supply apparatus as claimed in claim 2 wherein the variables represented by the test signals include an electric voltage applied to the device and an electric current received by the device.

4. A power supply apparatus as claimed in claim 3 for supplying a semiconductor laser of said device with electric energy, wherein the variables represented by the test signals also include the radiant power of the laser and a signal produced by a monitor connected to the laser.

5. A power supply apparatus as claimed in claim 1 wherein the variables represented by the test signals include an electric voltage applied to the device and an electric current received by the device.

6. A power supply apparatus as claimed in claim 5 for supplying a semiconductor laser of the device with electric energy, wherein the variables represented by the test signals also include the radiant power of the laser and a signal produced by a monitor connected to the laser.

7. A power supply apparatus for supplying electric energy to a device with multiple variables, said power supply apparatus comprising:

- a number of test inputs for receiving respective test signals from the device wherein at least one of said test signals is dependent on a device variable which itself is dependent on the power applied to the device,
- a reference signal generator which generates a number of reference signals which corresponds to the number of test inputs, said reference signals being a measure of desired values of the device variables,
- a number of comparator circuits corresponding to the number of test inputs, each comparator circuit having a first and second input,
- means coupling the first inputs of the comparator circuits to respective test inputs,
- second means coupling the second inputs of the comparator circuits to the reference signal generator so as to receive therefrom respective reference signals,
- a control member having input means coupled to outputs of the comparator circuits, said control member being operative to control the power applied to the device by the power supply apparatus so that at least one of the variables corresponding to one of the test signals is equal to the desired value of said one variable, and wherein the control member controls other variables corresponding to other test signals so that they deviate from their respective desired values in a predetermined sense.

8. A power supply apparatus as claimed in claim 7 wherein the control member comprises a number of semiconductor diodes corresponding to the number of test inputs, means connecting first terminals of the semiconductor diodes via said input means to respective outputs of the comparator circuits, and means connecting second terminals of the semiconductor diodes together and to a current source and to a control output of the control member.

9. A power supply apparatus as claimed in claim 8 wherein said first terminals of the semiconductor diodes are the cathode electrodes and the second terminals of the semiconductor diodes are the anode electrodes.

10. A power supply apparatus as claimed in claim 8 wherein the comparator circuits produce output voltages which corresponds to deviations of their respective test signals from the respective desired values supplied by the reference signal generator, and wherein the control member derives a control voltage for controlling the power applied to the device, said control voltage being equal to the lowest one of the output voltages of the comparator circuits.

11. A power supply apparatus as claimed in claim 7 wherein the variables represented by first and second test signals include a voltage applied to the device and a current received by the device.

12. A power supply apparatus as claimed in claim 11 wherein said device comprises a semiconductor laser and the variables represented by third and fourth test signals include the radiant power of the semiconductor laser and a signal produced by a monitor coupled to the semiconductor laser, respectively.

13. A power supply apparatus as claimed in claim 7 wherein said control member controls the power applied to the device so that said other variables are all below their respective desired values.

14. A power supply apparatus as claimed in claim 7 wherein each test signal is dependent on a respective device variable, each said variable being dependent on the power applied to the device.

15. A power supply apparatus as claimed in claim 14 wherein the control member derives a control signal for controlling the electric energy applied to the device, said control signal being determined by the highest one of the input voltages received from the comparator circuits.

16. A power supply apparatus as claimed in claim 7 wherein the control member derives a control voltage for controlling the power applied to the device, said control voltage being determined by the lowest one of the input voltages received from the comparator circuits.

17. A power supply apparatus as claimed in claim 7 wherein said device comprises a semiconductor laser.

* * * * *